United States Patent [19]

Agger et al.

[11] 4,268,646

[45] May 19, 1981

[54] ADHESIVE COMPOSITIONS

[75] Inventors: Reginald T. Agger, Queniborough; Peter R. Tyers, Leicester, both of England

[73] Assignee: USM Corporation, Farmington, Conn.

[21] Appl. No.: 95,543

[22] Filed: Nov. 19, 1979

[30] Foreign Application Priority Data

Dec. 7, 1978 [GB] United Kingdom ............ 47490/78

[51] Int. Cl.³ ............................................. C08L 75/06
[52] U.S. Cl. ............................ 525/440; 260/32.8 N; 525/127; 525/131; 525/455; 525/920
[58] Field of Search ............... 525/920, 126, 127, 440, 525/131, 455

[56] References Cited

U.S. PATENT DOCUMENTS

| | | | |
|---|---|---|---|
| 3,509,234 | 4/1970 | Burlant | 525/920 |
| 3,531,364 | 9/1970 | Schmidle | 525/127 |
| 3,719,638 | 3/1973 | Huemmer | 525/126 |
| 3,919,351 | 11/1975 | Chang | 525/127 |
| 3,966,681 | 6/1976 | Maeda | 525/440 |
| 4,128,600 | 12/1978 | Skinner | 525/126 |

*Primary Examiner*—Paul Lieberman
*Attorney, Agent, or Firm*—John P. Morley

[57] ABSTRACT

A polyurethane composition, e.g. suitable for use in solution as an adhesive or primer for bonding tread members to shoes. The polyurethane is made from reactants comprising polyisocyanate, hydroxyl terminated polyol, difunctional reaction product of methyl methacrylate and a substituted alkene (e.g. but-2-ene 1.4 diol) having two chemical groups available for reaction with isocyanate, and chain extender.

13 Claims, No Drawings

ADHESIVE COMPOSITIONS

BACKGROUND OF THE INVENTION

1. Field of the Invention

This invention relates to novel, improved adhesive compositions. More precisely, this invention relates to novel improved polyurethane adhesive compositions particularly useful in bonding shoe tread members.

2. Description of the Prior Art

Polyurethane compositions useful as adhesives, coatings and primers are known to the art. For example, adhesive compositions comprising polyurethane dissolved or otherwise dispersed in a suitable solvent(s) have been used for the exacting task of bonding tread members to shoes by a heat activation process. Where used here, the term "shoe" relates to outer footwear generally and includes the article in the course of manufacture. The expression "tread members" where used here relates to shoe soles, heels and sole and heel units.

Commercially available polyurethane adhesives have been used to form a satisfactory bond between shoes and tread members of various materials including roughened leather, polyvinylchloride and polyurethane. However, usually some pretreatment of the materials is required to achieve bonds of adequate strength and heat resistance for sole attaching purposes. For example, problems have been encountered in bonding tread members based on thermoplastic rubbers (e.g. styrene-butadiene-styrene block copolymers) with polyurethane adhesives, especially to shoes with polyvinyl chloride uppers. Chlorination pretreatment procedures have been employed in such instances to improve bonding of such members with polyurethane adhesives. These procedures yield generally acceptable results in many cases but precautions are required to avoid health hazards. Furthermore, the procedure frequently has to be carried out by manual operation in order to repeatedly produce consistently acceptable results. Accordingly, chlorination pretreatment is potentially hazardous or unreliable under shoemaking production conditions.

Another known pretreatment of tread members of resin rubber, i.e. high styrene-butadiene-styrene copolymer resins to improve bonding with polyurethane compositions involves the use of primer solutions which are applied to the tread member to improve adhesive performance characteristics. These primers may be applied by conventional roller coating techniques and present no greater health hazards than are created at the stage of adhesive application. However, their use is restricted to a limited number of shoemaking materials.

Attempts have also been made in the art to develop improved polyurethane compositions which can provide satisfactory bonding to a variety of surfaces so that pretreatment might be avoided or at least minimized. As those in the art know, polyurethanes employed in solution based primers and adhesives are usually thermoplastic reaction products of for example polyisocyanate, polyol and chain extender. Improved bonding of polyurethane adhesives to thermoplastic rubber has been achieved by compounding them with resins, for example polymethyl methacrylate. These resin/polyurethane compositions provide improved bond strength and heat resistance of the bonds and reduce the incidence of pretreatment required. However, the compositions have inferior properties for example in relation to spotting tack, and solution stability. "Spotting tack" is especially significant in those processes in which the adhesive is applied to the workpiece, heat activated and then the shoe and tread member are brought together with the adhesive between them and pressed together to achieve bonding. "Spotting tack" where used here means the ability of an adhesive film to adhere to a similar adhesive film when one or both are heated and they are then pressed together. A comparison of this property for various compositions is given by noting the time during which the heated film or films remain capable of adhering to an unheated adhesive film or to each other. An indication of the bond strength is given by a determination of the force required to peel a sample bond apart and the type of failure induced in the bond. An indication of heat resistance is given by noting the extent to which a bond can be separated by a given force at elevated temperature. Spotting tack in the region of 15 to 30 seconds, peel strength of more than 100 Newtons/25 mm and creep results at 60° C. for 10 minutes of less than 50 mm under a peel load of 1.9 Kg are highly desirable performance characteristics for adhesives for bonding tread members to shoes.

SUMMARY OF THE INVENTION

This invention provides novel, improved adhesives formed by including certain selected functional materials in certain amounts in polyurethane forming reactants. The improved polyurethane adhesive compositions of this invention provide effective adhesion to materials including thermoplastic rubber, and are suitable for example as primers or as adhesives for use in attaching tread members to shoes.

DESCRIPTION OF THE PREFERRED EMBODIMENTS

The functional materials involved in preparing the polyurethane adhesive compositions of this invention are difunctional reaction products of unsaturated monomers including methyl methacrylate with a substituted alkene which has two groups available for reaction with isocyanate for example a dihydroxy mono alkene. The groups available for reaction with isocyanate may be hydroxyl or amino groups for example. Preferred substituted alkenes include but-2-ene 1.4 diol and hexene 1.6 diols. Unsaturated monomers, for example styrene, and methyl acrylate may be employed in admixture with methyl methacrylate, although the use of methyl methacrylate appears essential in order to promote adhesion of the polyurethane adhesives to surfaces of certain tread members including those based on thermoplastic rubber.

The preferred diol materials are formed by reaction of but-2-ene 1.4 diol with methyl methacrylate monomer in hot solution in the presence of a catalyst (e.g. dibenzoyl peroxide). Preferred materials have a limiting viscosity number of up to 50 cm$^3$g$^{-1}$, more preferably in the range 3 to 15.

Polyisocyanates which may be used in preparation of the polyurethanes include aliphatic, cycloaliphatic and aromatic diisocyanates for example 1,6-hexane diisocyanate, 1,4-cyclohexylene diisocyanate, 1-methyl-2,4-diisocyanato cyclohexane, 1-methyl-2,6-diisocyanato cyclohexane, 2,4-and 2,6-diisocyanato toluene and commercial mixtures thereof, 4,4'-diphenylmethane diisocyanate and 4,4'-diphenylpropane diisocyanate. 4,4'-diphenylmethane diisocyanate is particularly suitable.

Chain extenders which may be used in preparation of the polyurethanes include lower aliphatic diols, diamines and amino alcohols and mixtures thereof, for example ethylene glycol, 1,4-butane diol, and 1,6-hexane diol. Where dispersibility in water is required, a chain extender may be used which is a tertiary amine, e.g. N-methyl diethanolamine, so that the polyurethane may be treated with acid (e.g. acetic or hydrochloric acid) and then with water to form a dispersion.

Polyols which may be used in preparation of the polyurethanes include those normally recognized as suitable for polyurethanes, although polyalkylene glycols are not preferred in preparing polyurethanes for sole attaching adhesives. Polyesters, polylactones or polytetramethylene glycol in the molecular weight range of about 500 to 6000 are preferably employed. Particularly preferred materials are substantially linear hydroxyl terminated polyesters having an acid number between 0 and 4 (mg KOH per g) and a molecular weight from 1800 to 4000 which correspond to the reaction products of one or more dicarboxylic acids and one or more α, ω diols. Suitable dicarboxylic acids include the benzene dicarboxylic acids and more preferably those of the general formula $HOOC(CH_2)_nCOOH$ (where n is an integer from 2 to 12) as exemplified by adipic, azelaic and sebacic acids. Suitable α, ω diols include the lower aliphatic diols comprising a molecular chain having not more than six carbon atoms which may have substituents such as oxygen in the chain or substituents such as methyl or ethyl groups on the chain, for example 1,4-butane diol, 1,6-hexane diol, diethylene glycol and 2-ethyl hexane diol-1,6. Preferred polyesters are polybutylene adipates of molecular weight 2000.

In making polyurethane compositions of this invention, it is important to employ appropriate amounts of the polyisocyanate, polyol, reaction product and chain extender in order to obtain a required balance of properties for the particular contemplated end use of the composition. For adhesives for bonding tread members to shoes, these properties include among others, stability of the solution or dispersion, spotting tack, heat resistance and bond strength. The preferred compositions providing an optimum balance of properties for bonding tread members to shoes are polyurethanes formed from the preferred ingredients in which the reaction product provides from 0.1 to 25% by weight of the polyurethane (preferably about 2% by weight of the polyurethane), the molar ratio of reaction product plus chain extender to polyol lies in the range between about 0.1:1 to about 1.5:1, more preferably in the range between about 0.4:1 to about 1.0:1, and the ratio of reactive isocyanate groups to reactive groups of the polyol, reaction product, and chain extender, lies in the range between about 0.90:1 to about 1.4:1 (more preferably about 0.98:1). For compositions for other applications, e.g. primers where some properties are less critical, e.g. spotting tack, these ranges may be varied somewhat provided that the adhesion characteristics are not unduly impaired.

Compositions according to the invention preferably comprise solutions of the polyurethanes in somewhat volatile organic solvents. The solutions may comprise for example up to about 30% by weight polyurethane, but for sole attaching adhesives solutions having from about 15 to about 25% by weight polyurethane are preferred. Suitable solvents include a large proportion of low boiling organic liquid for example methyl ethyl ketone, isopropyl acetate, toluene or acetone. Methyl ethyl ketone is preferred as a solvent and provides a solution having a viscosity of about 3.0 to about 3.3 Pascal seconds at 25° C.

Polyurethanes for compositions according to the invention may be made in any convenient manner for example by use of the liquid or molten materials or by reaction of the materials in a solution or dispersion in a substantially inert organic solvent.

Manners of making and using the invention as well as the advantages derived from the invention will be better appreciated by reference to the following illustrative, non-limiting Examples.

EXAMPLE I

In this Example, compositions A, B, C and E are comparative compositions while compositions D, F, and G are compositions within and illustrative of the invention. Compositions A and B employ a commercially available polyurethane solution adhesive while composition C employs this adhesive with an additional content of a polymethacrylate, composition E employs a polyurethane made in a similar manner to that of composition D. None of the polyurethanes of the comparative compositions were made from reactants including the selected diol materials. Compositions D, F, G and H comprise a polyurethane solution or dispersion of polyurethane composition formed from polyisocyanate, hydroxyl terminated polyol, a difunctional reaction product of methyl methacrylate with a substituted alkene having two chemical groups available for reaction with isocyanate, and chain extender.

The difunctional reaction product was formed from but-2-ene diol 1.4 and distilled methyl methacrylate in a molar ratio of 1 to 20. Specifically, 7.675 g of but-2-ene diol 1.4 was dissolved in 160 cc of toluene and heated to 90° C. 10.925 g of dibenzoyl peroxide dissolved in redistilled methyl methacrylate monomer was added over a period of one hour. The reaction was continued at 90° C. for four hours. 1.093 g dibenzoyl peroxide was added, and the reaction was continued for one hour at 100° C. The mixture was cooled and the solvent removed. The reaction product was a brittle resinous material having a limiting viscosity number of 9.0 $cm^3g^{-1}$ (as described in "Properties of Polymers" by D. W. Van Krevelen-1972-Chapter 15), identified as hydroxyl terminated material.

Compositions D to H were formed by reaction of ingredients in the molar ratios shown in Table I. The polyurethanes used in compositions D and E were made as follows: 210 g of butylene adipate polyester (hydroxyl value 41 mg KOH/g and acid value 0.3 mg KOH/g) and 39.69 g of 4,4'-diphenyl methane diisocyanate were melted together and allowed to react for one hour at 100° C. to form a thick liquid prepolymer. The polyurethane for composition D was prepared using 83.2 g of this prepolymer mixed hot with 2.19 g 1,4 butane diol and 8.32 g of the difunctional reaction product. This intimate mixture was reacted for 16 hours at 95° C. The product on cooling was a very tough rubbery polymer. The polyurethane for composition E was prepared using 83.2 g of the isocyanate prepolymer mixed hot with 2.53 g 1,4 butane diol and reacted for 16 hours at 95° C. When cooled, a tough rubbery polymer resulted. To provide compositions D and E, the rubbers were chipped and dissolved in methyl ethyl ketone to 20% total solids and worked up to provide solutions of about 3 Pascal seconds at 25° C. The polyurethane used in composition F was made in solution using the same polyester, reaction product, and diisocyanate, and chain extender comprising 1.4 butane diol. The polyester and diisocyanate were blended in toluene and the chain extender and reaction product added. After reaction, additional solvent was added to provide a solution of 18% total solids having a viscosity of about 3 Pascal seconds at 25° C.

Composition G was in the form of an aqueous dispersion. The polyurethane used in composition G was made as follows: 290 g butylene adipate (Hydroxyl value 39.5 mg KOH/g and acid value 0.3 mg KOH/g) and 44.87 g diphenyl methane diisocyanate were melted together and allowed to react for 1 hour at 90° C. to form a thick liquid prepolymer. 9.181 g N-methyl diethanolamine and 6.96 g of the example difunctional reaction product of methyl methacrylate and 2-butene-1,4 diol, were added and mixed in. This intimate mixture was reacted for 16 hours at 95° C. A tough rubbery polymer resulted, which, when dissolved to 25% solids in Acetone (1 part by weight) and methyl ethyl ketone (2 parts by weight) gave a viscosity of 0.9 Pascal seconds at 25° C. In order to make the dispersion, 300 g of the tough rubbery polyurethane were dissolved in 685 g acetone. 12.2 cc of 5 N Hydrochloric acid were added slowly with constant agitation at 50° C. 537 g distilled water were then added slowly and with constant stirring. This thick white dispersion was heated to 60° C. and the solvent removed under vacuum. The resulting dispersion was a milky, slightly thixotropic liquid with a solids content of 35%.

Spotting tack, bond strength and heat resistance of the adhesive compositions were compared with known procedures and adhesives.

To examine the spotting tack of each composition, samples were prepared by spreading a thin layer, about 0.3 mm thick, of the composition (which had been stored for two weeks) on strips of black PVC shoe soling material and roughed upper leather. The composition was allowed to dry out over a period of one day. The film of adhesive on the PVC was then activated by heating to 90° C. in a time of about 5 seconds using an infra red heater. The period of time (in seconds) during which the heated film on the PVC soling strip remained capable of adhering to the unheated film on a leather strip was noted. Results are given in Table II.

Bond strength and heat resistance were assessed by "peel" and "creep" tests carried out on sample bonds made by methods simulating the attachment of a tread member in the form of a preformed sole to a shoe. The sample bonds were prepared using 25 mm×75 mm strips of upper material. Various soling materials were used, including Long and Hambley SR4 standard resin rubber and TR rubbers classified by Satra according to their considered ease of bonding. The TR rubbers were wiped with SBP2, a mixture of organic solvents having a boiling range of 70° to 95° C., prior to application of adhesive. The resin rubber was roughed prior to application of adhesive, and leather upper materials were roughed prior to application of the adhesive. In the case of adhesive composition B, the soling materials were also given a halogenation treatment with a 2% by weight solution of trichlorisocyanuric acid (trichlor 1,3,5-triazine trione) in low boiling organic solvent and allowed to dry prior to application of the adhesive. The composition to be tested was applied to each of the strips, allowed to dry out completely overnight at room temperature and the dried film of adhesive on the soling material then activated by heating to a temperature of 90° C. in a time of about 5 seconds using an infra red heater. The strips were then pressed together, with the films in contact, at 60 p.s.i.

In the peel tests, sample bonds aged for one week at room temperature were peeled apart at a rate of 50 mm per minute, using a horizontal Hounsfield tensiometer. The force in Newtons required to separate the bonds, and the type of failure induced, are noted in Table II.

In the creep tests sample bonds aged for one day at room temperature were heated to a test temperature of 60° C. in an oven and then separated by subjecting them to a peeling force using a 4-lb (1.9 Kg) weight. The number of mm of movement of the bond line in 10 minutes is shown in Table II.

Compositions A and B employed UNIGRIP (Registered Trade Mark) 8300, a polyurethane solution sole attaching adhesive available in the UK. Composition C employed UNIGRIP 8300 modified by addition of 10% by weight of a polymethyl methacrylate of high molecular weight.

The PVC soling used had a hardness of 80 on the Shore A scale.

The TR.1 soling used was an easily bondable commercially available soling material known as Trooflex comprising thermoplastic rubber.

TR(a), (b), (c) and (d) are standard test soling materials classified by Satra as easy bondable, moderately easy, moderately difficult, and difficult respectively.

The leather used was double buffed full chrome whole buff pearl split upper leather supplied by Charles F. Steed & Co. Ltd.

TABLE I

| Ingredients of Polyurethane | Compositions | | | |
|---|---|---|---|---|
| | D | E | F | G |
| Polyester (moles) | 1 | 1 | 1 | 1 |
| Reaction Product (moles) | 0.162 | — | 0.0336 | 0.034 |
| Chain Extender (moles) | 0.945 | 1.09 | 0.60 | 0.75 |
| Polyisocyanate (moles) (4.4', diphenyl methane diisocyanate) | 2.053 | 2.053 | 1.67 | 1.75 |

TABLE III

| Tread Member | Shoe | COMPOSITION: | | | | | | |
|---|---|---|---|---|---|---|---|---|
| | | A | B | C | D | E | F | G |
| Peel Tests (Newtons/25mm) | | | | | | | | |
| PVC | Leather | 120* | 120* | 136* | 135* | 135* | 120* | 100* |
| TR.1 | Leather | 68 | 200* | 136* | 180* | 20 | 230* | 150* |
| TR (a) | Leather | 31 | 135* | | | | 230* | |
| TR (b) | Leather | 18 | 135* | | | | 165* | |
| TR (c) | Leather | 22 | 135* | | | | 110 | |
| TR (d) | Leather | 5 | 45 | | | | 60 | |
| Resin Rubber | Leather | 20 | 218* | 58 | 52 | 20 | 100* | 58 |
| Creep Tests (mm/10 mins. at 60° C. - 1.9Kg) | | | | | | | | |

TABLE III-continued

| Tread Member | Shoe | COMPOSITION: | | | | | | |
|---|---|---|---|---|---|---|---|---|
| | | A | B | C | D | E | F | G |
| PVC | Leather | 5 | 5 | 5 | 14 | 10 | 0 | 20 |
| Spotting Tack | | 23 | 23 | 5 | 20 | 20 | 20 | 15 |
| Stability of Composition | | Good | | Poor | Good | Good | Good | Good |

*signifies tearing of substrate. All other bonds separated off the soling material.

EXAMPLE II

This Example illustrates the use of a composition of the invention as a primer for adhesive attachment of tread members to shoes.

A portion of the composition D was diluted to about 5% total solids with methyl ethyl ketone to provide a primer composition which was applied as a primer on a strip of TR.1. The adhesive composition A was then applied over the primer and also to a roughed leather strip. After evaporation of the solvent, the adhesive on the TR.1 strip was heat activated by heating to a temperature of 90° C. in about 5 seconds using an infrared heater. The strips were pressed together with the films in contact, at 60 p.s.i. A peel bond test result of 180 (N/25 mm) was obtained.

EXAMPLE III

This example illustrates the use of a composition of the invention as an adhesive for adhesive attachment of injection direct molded tread members of thermoplastic rubber onto shoes.

A strip of upper leather was coated with adhesive composition D and the solvent allowed to evaporate. A soling compound comprising thermoplastic rubber was injected at 185° C. onto the adhesive film. After cooling, separation of the leather to TR bond was achieved with tearing of the TR rubber layer.

From the foregoing, it will be apparent that compositions D, F and G of this invention exhibit excellent adhesion to TR rubber. These adhesive compositions also exhibit good spotting tack and stability of their solution or dispersion.

We claim:

1. A composition comprising a polyurethane formed from reactants comprising:
   (a) polyisocyanate,
   (b) a hydroxyl terminated polyol,
   (c) a difunctional reaction product of methyl methacrylate with a substituted alkene having two chemical groups available for reaction with isocyanate and selected from the group consisting of hydroxyl and amino groups and where the difunctional reaction product has a limiting viscosity number up to about 50 $cm^3g^{-1}$ and is present in an amount to provide from about 0.1 to about 25 percent by weight of the polyurethane and,
   (d) a chain extender selected from the group consisting of aliphatic diols, diamenes, amino alcohols and mixtures of these,
and where the molar ratio of reaction product plus chain extender to polyol is in the range between about 0.1:1 to about 1.5:1 and the ratio of reactive isocyanate groups to reactive groups of the polyol, reaction product and chain extender is in the range between about 0.90:1 to about 1.4:1.

2. A composition comprising a polyurethane formed from reactants comprising:
   (a) a polyisocyanate,
   (b) a hydroxyl terminated polyol,
   (c) a difunctional reaction product of methyl methacrylate and a dihydroxy mono alkene and where the difunctional reaction product has a limiting viscosity number up to about 50 $cm^3g^{-1}$ and is present in an amount to provide about 0.1 to about 25 percent by weight of the polyurethane and,
   (d) a chain extender selected from the group consisting of aliphatic diols, diamenes, amino alcohols and mixtures of these,
and where the molar ratio of reaction product plus chain extender to polyol is in the range between about 0.1:1 to about 1.5:1 and the ratio of reactive isocyanate groups to reactive groups of the polyol, reaction product and chain extender is in the range between about 0.90:1 to about 1.4:1.

3. A composition of claim 2 where the reaction product is a reaction product of methyl methacrylate and 1.4-but-2-ene diol, or a 1.6 hexene diol.

4. A composition of claim 2 comprising a solution of the polyurethane in volatile organic solvent inert to the polyurethane.

5. A solution of claim 4 where the polyurethane represents about 5% by weight of the solution and the solvent is methyl ethyl ketone.

6. A composition of claim 2 where the polyol comprises a polyester polyol having a molecular weight in the range of about 500 to about 6000.

7. A composition of claim 2 where the polyol comprises a polytetramethylene adipate having a hydroxyl value of about 40 mg KOH/g and an acid value of about 0.3 mg KOH/g.

8. A composition of claim 2 where the chain extender is 1.4 butane diol.

9. A composition of claim 2 where the polyisocyanate comprises 4,4' diphenyl methane diisocyanate.

10. A composition of claim 2 where the reaction product has a limiting viscosity number of about 3 to about 15 $cm^3g^{-1}$, the reaction product is employed to an extent of about 2% by weight of the polyurethane, the molar ratio of reaction product plus chain extender to polyol is about 0.4:1 to about 1.2:1, and the ratio of reactive isocyanate groups to reactive groups of the polyol, reaction product and chain extender is about 0.98:1.

11. A composition of claim 2 comprising about 2.053 moles of 4,4' diphenyl methane diisocyanate, about 1 mole of a butylene adipate polyester, about 0.162 moles of the difunctional reaction product of but-2-ene diol 1.4 and methyl methacrylate and about 0.945 moles of 1,4 butane diol.

12. A composition of claim 2 comprising about 1.67 moles of 4,4' diphenyl methane diisocyanate, about 1 mole of a butylene adipate polyester, about 0.0336 moles of the difunctional reaction product of but-2-ene diol 1.4 and methyl methacrylate and about 0.60 moles of 1,4 butane diol.

13. A composition of claim 2 comprising about 1.65 moles of 4,4' diphenyl methane diisocyanate, about 1 mole of a butylene adipate polyester, about 0.034 moles of the difunctional reaction product of but-2-ene diol 1.4 and methyl methacrylate and about 0.75 moles of 1,4 butane diol.

* * * * *